(12) United States Patent
Feng et al.

(10) Patent No.: US 12,261,407 B2
(45) Date of Patent: Mar. 25, 2025

(54) CONTROL METHOD AND SYSTEM FOR STABILIZING EXCIMER LASER PULSE ENERGY

(71) Applicant: BEIJING RSLASER OPTO-ELECTRONICS TECHNOLOGY CO., LTD., Beijing (CN)

(72) Inventors: Zebin Feng, Beijing (CN); Xiaoquan Han, Beijing (CN); Rui Jiang, Beijing (CN); Junhong Yang, Beijing (CN); Hua Zhang, Beijing (CN); Qin Zhang, Beijing (CN); Xiang Wang, Beijing (CN); Mi Liao, Beijing (CN)

(73) Assignee: Beijing Rslaser Opto-Electronics Technology Co., Ltd., Beijing (CN)

( * ) Notice: Subject to any disclaimer, the term of this patent is extended or adjusted under 35 U.S.C. 154(b) by 860 days.

(21) Appl. No.: 17/389,400

(22) Filed: Jul. 30, 2021

(65) Prior Publication Data

US 2021/0359487 A1 Nov. 18, 2021

Related U.S. Application Data

(63) Continuation of application No. PCT/CN2019/076110, filed on Feb. 26, 2019.

(30) Foreign Application Priority Data

Feb. 19, 2019 (CN) .......................... 201910122841.2

(51) Int. Cl.
*H01S 3/134* (2006.01)
*H01S 3/13* (2006.01)
*H01S 3/225* (2006.01)

(52) U.S. Cl.
CPC ............ *H01S 3/134* (2013.01); *H01S 3/1305* (2013.01); *H01S 3/225* (2013.01)

(58) Field of Classification Search
CPC ............................. H01S 53/134; H01S 3/134
See application file for complete search history.

(56) References Cited

U.S. PATENT DOCUMENTS

2002/0191172 A1  12/2002  Go

FOREIGN PATENT DOCUMENTS

| CA | 2322005 C | 3/2003 |
| CN | 102368589 A | 3/2012 |

(Continued)

OTHER PUBLICATIONS

English Translation of Bao (Year: 2013).*

(Continued)

*Primary Examiner* — Minsun O Harvey
*Assistant Examiner* — Stephen Sutton Kotter
(74) *Attorney, Agent, or Firm* — Jeenam Park

(57) ABSTRACT

A control method for stabilizing excimer laser pulse energy includes: obtaining a measured energy value of the n-th pulse in a pulse sequence; calculating the difference between the measured energy value and the preset energy value; taking the z-th pulse of the sequence as a demarcation point, when n is a positive integer less than z, the discharge voltage value of the next pulse is calculated according to a first mathematical model, and when n is an integer greater than z−1, the discharge voltage value of the next pulse is calculated according to a second mathematical model; and the next pulse is generated according to the discharge voltage value. A control system based on the control method includes: a high-voltage discharge module, a laser cavity, a laser parameter measurement module, and an energy stability controller.

10 Claims, 2 Drawing Sheets

(56) References Cited

FOREIGN PATENT DOCUMENTS

| CN | 102790348 A |   | 11/2012 |
|----|-------------|---|---------|
| CN | 103094830 A | * | 5/2013  |
| CN | 108151889 A |   | 6/2018  |

OTHER PUBLICATIONS

International Search Report issued in corresponding International application No. PCT/CN2019/076110, mailed Nov. 28, 2019.
Written Opinion of the International Searching Authority for No. PCT/CN2019/076110.
Decision to grant patent from China patent office in a counterpart Chinese patent Application 201910122841.2, mailed Aug. 5, 2019.
First Office Action from China patent office in a counterpart Chinese patent Application 201910122841.2, mailed Aug. 5, 2019 (6 pages).

* cited by examiner

CONTROL METHOD AND SYSTEM FOR STABILIZING EXCIMER LASER PULSE ENERGY

CROSS-REFERENCE TO RELATED APPLICATIONS

This application is a U.S. continuation of co-pending International Patent Application Number PCT/CN2019/076110, filed on Feb. 26, 2019, which claims the benefit and priority of Chinese Patent Application Number 201910122841.2, filed on Feb. 19, 2019 with China National Intellectual Property Administration, the disclosures of which are incorporated herein by reference in their entireties.

TECHNICAL FIELD

This disclosure relates to the technical field of excimer lasers, and more particularly relates to a control method for stabilizing excimer laser pulse energy and a control system for implementing the control method.

BACKGROUND

The 193 nm Argon fluoride (ArF) excimer laser is a pulsed gas laser for deep ultraviolet applications. It has the characteristics of high repetition frequency, high energy, short wavelength, and narrow line width. It is therefore an excellent laser light source used for microelectronic photolithography systems. The laser light emitted by the excimer laser is emitted in the form of pulses. Due to the change of the electric charges or the deterioration of the operating gas, the energy may be different from one pulse to another. Furthermore, there may also be a certain deviation between the energy of the laser pulse and the set expected pulse energy. In the semiconductor photolithography process, the cumulative result of these deviations is manifested as overexposure or underexposure during the photolithography process, making the processed lines rough. In order to make the lithography precision lie within the allowable range, the energy stability of the excimer laser pulses must be well controlled. Therefore, solving the problem of control of energy stability is a key in the development of excimer lasers.

In the process of laser operation, due to the influence of gas temperature, gas degradation or renewal, operating time, or some other factors, an excimer laser will always experience fluctuations in the energy of individual pulses, drift of average pulse energy, and overshoot of individual pulse energy. These phenomena will all affect the dose stability and energy stability of the laser. Energy overshoot means that during the time interval between a set of pulses and another set of pulses in burst mode, the gas in a non-discharge state can cause the first few pulses to each group to be much higher than the other pulses under the same discharge high voltage. The individual pulse energy fluctuation and energy value overshoot are inherent characteristics of excimer lasers. Thus, it is difficult to improve this phenomenon simply by changing the optical characteristics of the laser itself, and control algorithms need to be adopted.

SUMMARY

In view of the above problems, the present disclosure proposes a technical solution of feedback control in two stages based on the position of the pulse in the pulse sequence.

The object of the present disclosure can be achieved through the following technical solutions.

A first aspect of the present disclosure provides a control method for stabilizing the energy of an excimer laser pulse. An excimer laser emits multiple pulse sequences, where each pulse sequence contains multiple pulses. The energy level of each pulse is controlled by limiting the corresponding discharge voltage value of the pulse. The discharge voltage value is calculated by a PI control algorithm. The control method may include the following operations:

obtaining a measured energy value of an n-th pulse in an m-th pulse sequence;

calculating a difference between the measured energy value and a preset energy value:

when n is a positive integer less than z, calculating a discharge voltage value of the (n+1)th pulse in the m-th pulse sequence according to a first mathematical model:

when n is an integer greater than (z−1), calculating a discharge voltage value of the (n+1)th pulse in the m-th pulse sequence according to a second mathematical model; and generating the (n+1)th pulse in the m-th pulse sequence according to the discharge voltage value;

Where m is an integer greater than 1.

Typically, the first mathematical model is expressed in the following formula (1):

$$HV(m, n+1) = PK_{p1}\left(E_{error}(m-1, n+1) + \frac{PK_1}{PT_1}\sum_{i=1}^{m-1} E_{error}(i, n+1)\right) \quad (1)$$

where $E_{error}(m-1, n+1)$ is the difference between the measured energy value and the preset energy value of the (n+1)th pulse in the (m−1)th pulse sequence, $\sum_{j=1}^{m-1} E_{error}(i, n+1)$ represents the sum of the difference between the measured energy value and the preset energy value of each (n+1)th pulse in the 1st~(m−1)th pulse sequences, $PK_{p1}$ is the proportional parameter of the PI control algorithm, $PK_1$ is the integral parameter of the PI control algorithm, and $PT_1$ is the control period parameter of the PI control algorithm.

Typically, the incremental form of the first mathematical model is expressed in formula (2):

$$\Delta HV(m, n+1) = pK_{p1}(E_{error}[m-1, n+1] - E_{error}(m-2, n+1)) + PK_{p1}\frac{PK_1}{PT_1}E_{error}(m-1, n+1) \quad (2)$$

where $\Delta HV(m, n+1)$ represents the amount of change between the discharge voltage value of the (n+1)th pulse in the m-th pulse sequence and the (n+1)th pulse in the (m−1)th pulse sequence, $E_{error}(m-1, n+1)$ is the difference between the measured energy value and the preset energy value of the (n+1)th pulse in the (m−1)th pulse sequence, $E_{error}(m-2, n+1)$ is the difference between the measured energy value and the preset energy value of the (n+1)th pulse in the (m−2)th pulse sequence, $PK_{p1}$ is the proportional parameter of the PI control algorithm, $PK_1$ is the integral parameter of the PI control algorithm, and $PT_1$ is the control period parameter of the PI control algorithm.

Thus, the discharge voltage value of the (n+1)th pulse in the m-th pulse sequence is expressed in the following formula (3):

$$HV(m,n+1) = HV(m-1,n+1) + \Delta HV(m,n+1) \quad (3)$$

Where HV(m−1, n+1) is the discharge voltage value of the (n+1)th pulse in the (m−1)th pulse sequence.

Typically, the second mathematical model is expressed in the following formula (4):

$$HV(m, n+1) = K_{p1}\left(E_{error}(m, n) + \frac{K_1}{T_1}\sum_{j=z+1}^{n} E_{error}(m, j)\right) \quad (4)$$

where $E_{error}(m, n)$ is the difference between the measured energy value and the preset energy value of the n-th pulse in the m-th pulse sequence, $\Sigma_{j=z+1}^{n} E_{error}(m, j)$ represents the sum of the difference between the measured energy value and the preset energy value of each of the (z+1)~n-th pulses in the m-th pulse sequence, $K_{p1}$ is the proportional parameter of the PI control algorithm, $K_1$ is the integral parameter of the PI control algorithm, and $T_1$ is the control period parameter of the PI control algorithm.

Typically, the incremental form of the second mathematical model is expressed in the following formula (5):

$$\Delta HV(m, n+1) = \quad (5)$$
$$K_{p1}(E_{error}(m, n) - E_{error}(m, n-1)) + K_{p1}\frac{K_1}{T_1}E_{error}(m, n)$$

where n is an integer greater than z, $\Delta HV(m, n+1)$ represents the amount of change between the discharge voltage value of the (n+1)th pulse in the m-th pulse sequence and the n-th pulse in the m-th pulse sequence, $E_{error}(m, n-1)$ is the difference between the measured energy value and the preset energy value of the (n−1)th pulse in the m-th pulse sequence, $E_{error}(m,n)$ is the difference between the measured energy value and the preset energy value of the n-th pulse in the m-th pulse sequence, $K_{p1}$ is the proportional parameter of the PI control algorithm, $K_1$ is the integral parameter of the PI control algorithm, and $T_1$ is the control period parameter of the PI control algorithm.

Thus, the discharge voltage value of the (n+1)th pulse in the m-th pulse sequence is expressed in the following formula (6):

$$HV(m,n+1)=HV(m,n)+\Delta HV(m,n+1) \quad (6)$$

Where HV(m,n) is the discharge voltage value of the n-th pulse in the m-th pulse sequence.

Typically, when the calculated HV(m, n+1) is greater than a first voltage threshold, the discharge voltage value of the (n+1)th pulse in the m-th pulse sequence is controlled to be equal to the first voltage threshold; and/or When the calculated HV(m, n+1) is less than a second voltage threshold, the discharge voltage value of the (n+1)th pulse in the m-th pulse sequence is controlled to be equal to the second voltage threshold.

Typically, when the calculated ΔHV(m, n+1) is greater than a third voltage threshold, for the first mathematical model, the discharge voltage value of the (n+1)th pulse in the m-th pulse sequence is controlled to be equal to the discharge voltage value of the (n+1)th pulse in the (m−1)th pulse sequence plus the third voltage threshold; and for the second mathematical model, the discharge voltage value of the (n+1)th pulse in the m-th pulse sequence is controlled to be equal to the discharge voltage value of the n-th pulse in the m-th pulse sequence plus the third voltage threshold; and/or when the calculated ΔHV(m, n+1) is less than a fourth voltage threshold, for the first mathematical model, the discharge voltage value of the (n+1)th pulse in the m-th pulse sequence is controlled to be equal to the discharge voltage value of the (n+1)th pulse in the (m−1)th pulse sequence plus the fourth voltage threshold; and for the second mathematical model, the discharge voltage value of the (n+1)th pulse in the m-th pulse sequence is controlled to be equal to the discharge voltage value of the n-th pulse in the m-th pulse sequence plus the fourth voltage threshold.

Typically, the z may be an integer that lies in the range of 10-100.

A second aspect of the present disclosure provides a control system for stabilizing pulse energy of an excimer laser, the system including:

a high-voltage discharge module that generates a pulsed high voltage according to a set discharge voltage value;

a laser cavity, containing an operating gas, which is shocked by the pulsed high voltage to trigger the laser cavity to generate a first laser pulse;

a laser parameter measurement module, where the first laser pulse is divided into a second laser pulse used for operation and a third laser pulse used to calculate the discharge voltage value of the next first laser pulse after passing through the laser parameter measurement module; and a energy stabilization controller that obtains the energy value of the third laser pulse, calculates the discharge voltage value of the next first laser pulse, and transmits the discharge voltage value to the high-voltage discharge module.

Typically, the laser parameter measurement module includes a beam splitter and an energy detector, and the first laser pulse is divided into the second laser pulse used for operation and the third laser pulse for calculating the discharge voltage value of the next first laser pulse after passing through the beam splitter. The third laser pulse is converted into an electric signal after passing through the energy detector that is sent to the energy stabilization controller.

The ratio of the energy of the second laser pulse to the energy of the third laser pulse is (90~95)%:(10~5)%.

Compared with the related art, a method for segmented feedback control based on the position of the pulse in the pulse sequence that is provided by the present disclosure can effectively control the serious energy overshoot of the first few pulse of each pulse sequence, while taking into account the energy stability of all pulses in a pulse sequence. Thus, the energy of all laser pulses emitted by the laser is stabilized at a certain level to meet the precision requirements of semiconductor lithography. The control method is simple and effective. The control system based on this control method also has a simple structure, and only a small amount of energy needs to be separated from the emitted laser pulse to stabilize the entire system.

DETAILED DESCRIPTION OF ILLUSTRATIVE EMBODIMENTS

For a better understanding of the objectives, technical solutions, and advantages of the present application, hereinafter the present application will be described in further detail in connection with the accompanying drawings and some illustrative embodiments. It is to be understood that the specific embodiments described here are intended for the mere purposes of illustrating this application, instead of limiting.

For a more detailed and complete description of the present disclosure, the following contends provide an illustrative description of the implementation and specific embodiments of the present disclosure. This however does not represent the only way to implement or use the specific embodiments according to the present disclosure. The embodiments disclosed herein cover the features of a number of specific embodiments and the method steps and sequences used to construct and operate these specific embodiments. However, other specific embodiments can also be used to achieve the same or equal functions and sequence of steps.

Figure 1:
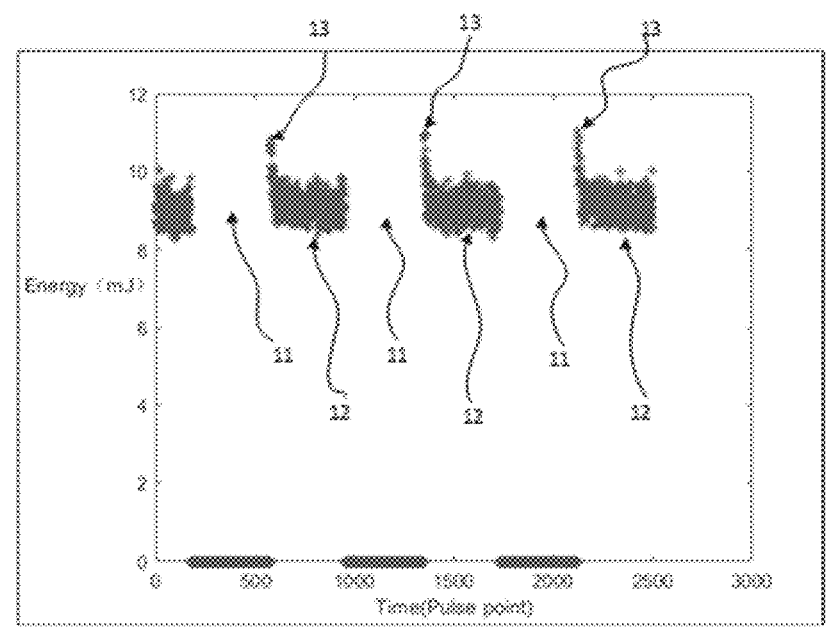
FIG. 1 is a schematic diagram illustrating the distribution of the emitted light energy of a laser operating in a Burst mode according to an embodiment of the present disclosure.

In the application scenario of semiconductor lithography, excimer lasers are based on the burst operating mode of the laser. By the burst operating mode, it means that after the laser generates a sequence of laser pulses, there is a time interval during which operation is paused, which is the burst interval, and then the laser continues to output another sequence of lasers pulses, and so on. FIG. 1 is an energy distribution diagram of the laser provided by the embodiment of the present disclosure operating in the Burst operating mode, where 12 represents the laser light pulse sequence, 11 represents the Burst interval. Due to the existence of the Burst interval 11, the energy of the first few pulses of each laser pulse sequence is much higher than that of the subsequent pulses under the condition that the discharge high voltage of the laser remains unchanged, as illustrated in FIG. 13. This phenomenon is defined as energy overshoot. Due to the phenomenon of energy overshoot, the stability of the laser output energy is difficult to meet the energy stability requirements of semiconductor lithography when the discharge high voltage remains unchanged.

The energy level of the pulse can be adjusted by controlling the corresponding discharge voltage value of this pulse. In the present field, the discharge voltage value is generally calculated by the PI control algorithm. Therefore, the present disclosure proposes a segmented feedback control method based on the position difference of the pulses in the pulse sequence where the pulses are located, this method specifically includes: first obtaining the measured energy value of the n-th pulse in the m-th pulse sequence: then calculating the difference between the measured energy value and the preset energy value; when n is a positive integer less than z, calculating the discharge voltage value of the (n+1)th pulse in the m-th pulse sequence according to a first mathematical model; when n is an integer greater than (z−1), calculating the discharge voltage value of the (n+1)th pulse in the m-th pulse sequence according to a second mathematical model; and generating the (n+1)th pulse in the m-th pulse sequence according to the calculated discharge voltage value. In the above, z is the sequence number of the pulse that undergoes energy overshoot in the pulse sequence.

Regarding the burst intervals of the same excimer laser, the sequence positions of the overshoot pulses are similar in different pulse sequences. Thus, the appropriate z value can be optimized after obtaining a large amount of data from the pulse energy test experiment. According to some embodiments of the disclosure, z may be an integer that lies in the range of 10 to 100. Furthermore, the common z value may lie in the range of 15 to 35. For example, in other embodiments of the disclosure, z is typically selected as the value of 20 for the control, and the first mathematical model is used to calculate the discharge voltage value of the 1st to 20th pulses of each pulse sequence, and the second mathematical model is used to calculate the discharge voltage value of the pulses after the 20th pulse of each pulse sequence.

According to some embodiments of the disclosure, the basis for establishing the first mathematical model refers to the discharge voltage and light output energy of the pulses with the same sequential number in the historical pulse sequences. Therefore, starting from the second sequence, the calculation of the discharge voltage value of the first z pulses of each sequence can all refer to the discharge voltage value and light output energy value of the pulses with the same sequential number in the historical pulse sequences, while the discharge voltage value of the first z pulses of the first sequence can be selected as an appropriate average value based on a large amount of experiments. In particular, let the preset energy value be $E_{set}$, the measured energy value of the n-th pulse in the m-th pulse sequence when the laser emits light be $E_{measured}(m,n)$, and the difference between the measured energy value and the preset energy value be denoted as $E_{error}(m,n)$, then the PI control algorithm is used based on the differences, and the first mathematical model is established as expressed in the following formula (1):

$$HV(m, n+1) = PK_{p1}\left(E_{error}(m-1, n+1) + \frac{PK_1}{PT_1}\sum_{i=1}^{m-1}E_{error}(i, n+1)\right) \quad (1)$$

where $E_{error}(m-1, n+1)$ is the difference between the measured energy value and the preset energy value in the (n+1)th pulse in the (m−1)th pulse sequence, $E_{j=1}^{m-1} E_{error}(i, n+1)$ represents the sum of the difference between the measured energy value and the preset energy value of each (n+1)th pulse in the 1st~(m−1)th pulse sequences, $PK_{p1}$ is the proportional parameter of the PI control algorithm, $PK_1$ is the integral parameter of the PI control algorithm, and $PT_1$ is the control period parameter of the PI control algorithm. Through this first mathematical model, when the difference between the measured energy value and the preset energy value of the (n+1)th pulse in each of the 1st~(m−1)th pulse sequences is known, then the discharge voltage value of the (n+1)th pulse in the m-th pulse sequence can be estimated.

In the process of implementing the control algorithm, due to the existence of $E_{i=1}^{m-1} E_{error}(i, n+1)$, it will take up a lot of memory and be prone to integral saturation phenomenon also appears, thus making it difficult to implement. Thus, in the engineering implementation, the incremental form of PI feedback control algorithm is adopted, and the implementation formula is expressed in the following formula (2):

$$\Delta HV(m, n+1) = pK_{p1}(E_{error}[m-1, n+1] - E_{error}(m-2, n+1)) + \\ PK_{p1}\frac{PK_1}{PT_1}E_{error}(m-1, n+1) \quad (2)$$

where $\Delta HV(m, n+1)$ represents the amount of change between the discharge voltage value of the (n+1)th pulse in the m-th pulse sequence and the (n+1)th pulse in the (m−1)th pulse sequence, $E_{error}$(m−1, n+1) is the difference between the measured energy value and the preset energy value of the (n+1)th pulse in the (m−1)th pulse sequence, $E_{error}$(m−2, n+1) is the difference between the measured energy value and the preset energy value of the (n+1)th pulse in the (m−2)th pulse sequence, $PK_{p1}$ is still the proportional parameter of the PI control algorithm, $PK_1$ is still the integral parameter of the PI control algorithm, and $PT_1$ is still the control period parameter of the PI control algorithm. Then the discharge voltage value of the (n+1)th pulse in the m-th pulse sequence is expressed in the following formula (3):

$$HV(m,n+1)=HV(m-1,n+1)+\Delta HV(m,n+1) \quad (3)$$

Where HV(m−1, n+1) is the discharge voltage value of the (n+1)th pulse in the (m−1)th pulse sequence.

According to other embodiments of the present disclosure, the basis for establishing the second mathematical model only needs to refer to the discharge voltage value and the emitted light energy value of the historical pulses in the same sequence, and does not involve the historical pulse sequences and the positions of the pulses in the sequence. As such, a PI feedback control algorithm is created, and the second mathematical model is established as is expressed in the following formula (4):

$$HV(m, n+1) = K_{p1}\left(E_{error}(m, n) + \frac{K_1}{T_1}\sum_{j=z+1}^{n} E_{error}(m, j)\right) \quad (4)$$

where $E_{error}$(m,n) is the difference between the measured energy value and the preset energy value of the n-th pulse in the m-th pulse sequence, $\sum_{j=z+1}^{n} E_{error}(m, j)$ represents the sum of the difference between the measured energy value and the preset energy value of each of the (z+1)~n-th pulses in the m-th pulse sequence, $K_{p1}$ is the proportional parameter of the PI control algorithm in the model, $K_1$ is the integral parameter of the PI control algorithm in the model, and $T_1$ is the control period parameter of the PI control algorithm in the model. Through this second mathematical model, when the difference between the measured energy value and the preset energy value of each of the (z+1)~n-th pulses in the same pulse sequence is known, the discharge voltage value of the (n+1)th pulse in the pulse sequence can be estimated.

Similarly, in the process of implementing the control algorithm, due to the existence of $\sum_{j=z+1}^{n} E_{error}(m, j)$, it will take up a lot of memory and be prone to integral saturation phenomenon also appears, thus making it difficult to implement. Thus, in this project, the incremental form of PI feedback control algorithm is adopted, and the implementation formula is expressed in the following formula (5):

$$\Delta HV(m, n+1) = \quad (5)$$
$$K_{p1}(E_{error}(m, n) - E_{error}(m, n-1)) + K_{p1}\frac{K_1}{T_1}E_{error}(m, n)$$

where ΔHV(m, n+1) represents the amount of change between the discharge voltage value of the (n+1)th pulse in the m-th pulse sequence and the n-th pulse in the m-th pulse sequence, $E_{error}$(m, n−1) is the difference between the measured energy value and the preset energy value of the (n−1)th pulse in the m-th pulse sequence, $E_{error}$(m,n) is the difference between the measured energy value and the preset energy value of the n-th pulse in the m-th pulse sequence, $K_{p1}$ is still the proportional parameter of the PI control algorithm in the model, $K_1$ is still the integral parameter of the PI control algorithm in the model, and $T_1$ is still the control period parameter of the PI control algorithm in the model.

It should be noted that when the measured energy value of the z-th pulse in the m-th pulse sequence is obtained, then according to the above definition, z is greater than (z−1), so the discharge voltage value of the (z+1)th pulse in the m-th pulse sequence is estimated according to formula (4), namely the second mathematical model, as expressed in the following formula (6):

$$HV(m, z+1) = K_{p1}\left(E_{error}(m, z) + \frac{K_1}{T_1}\sum_{j=z+1}^{z} E_{error}(m, j)\right) \quad (6)$$

Otherwise when the measured energy value of the (z−1)th pulse in the m-thpulse sequence is obtained, then according to the above definition, (z−1) is less than z, so the discharge voltage value of the z-th pulse in the m-th pulse sequence can be estimated according to formula (1), namely the first mathematical model, as expressed in the following formula (7):

$$HV(m, z) = PK_{p1}\left(E_{error}(m-1, z) + \frac{PK_1}{PT_1}\sum_{i=1}^{m-1} E_{error}(i, z)\right) \quad (7)$$

The incremental form of the discharge voltage value of the (z+1)th pulse in the m-th pulse sequence can be obtained by the formula (6) minus the formula (7), as expressed in the following formula (8):

$$\Delta HV(m, z-1) = K_{p1}\left(E_{error}(m, z) + \frac{K_1}{T_1}\sum_{j=z+1}^{z} E_{error}(m, j)\right) - \quad (8)$$
$$PK_{p1}\left(E_{error}(m-1, z) + \frac{PK_1}{PT_1}\sum_{i=1}^{m-1} E_{error}(i, z)\right)$$

Because the formula (8) is not equal to the formula (5), the incremental form of the discharge voltage value of the (z+1)th pulse in the m-th pulse sequence cannot be expressed by the formula (5). Therefore, in the formula (5), n should be an integer greater than z.

Then when n is an integer greater than z, the discharge voltage value of the (n+1)th pulse in the m-th pulse sequence is as expressed in the following formula (9):

$$HV(m,n+1)=HV(m,n)+\Delta HV(m,n+1) \quad (9)$$

Where HV(m,n) is the discharge voltage value of the n-th pulse in the m-th pulse sequence.

In the actual implementation, the discharge voltage value of the laser is limited by the inherent properties of the high-voltage module device, and there are maximum and minimum limits. Therefore, the first voltage threshold and the second voltage threshold that meet the inherent properties of the device are set in the two control algorithm segments. When the calculated HV(m, n+1) is greater than the first voltage threshold, the discharge voltage value of the (n+1)th pulse in the m-th pulse sequence is controlled to be equal to the first voltage threshold, and the (n+1)th pulse in the m-th pulse sequence is generated according to the first voltage threshold. When the calculated HV(m, n+1) is less than the second voltage threshold, the discharge voltage value of the (n+1)th pulse in the m-th pulse sequence is controlled to be equal to the second voltage threshold, and the second voltage threshold is used to generate the (n+1)th pulse in the m-th pulse sequence.

When simulating calculations in incremental form, in order to prevent dramatic changes in energy, which may cause system to be unstable or damaged. Thus, a third voltage threshold and a fourth voltage threshold are set for the amount of change between pulses in the implementation. When the calculated $\Delta HV(m, n+1)$ is greater than the third voltage threshold, in the case of the first mathematical model, the discharge voltage value of the (n+1)th pulse in the m-th pulse sequence is controlled to be equal to the discharge voltage value of the (n+1)th pulse in the (m−1)th pulse sequence plus the third voltage threshold. In the case of the second mathematical model, the discharge voltage value of the (n+1)th pulse in the m-th pulse sequence is equal to the discharge voltage value of the n-th pulse in the m-th pulse sequence plus the third voltage threshold. When the calculated $\Delta HV(m, n+1)$ is less than the fourth voltage threshold, in the case of the first mathematical model, the discharge voltage value of the (n+1)th pulse in the m-th pulse sequence is equal to the discharge voltage value of the (n+1)th pulse in the (m−1)th pulse sequence plus the fourth voltage threshold. In the case of the second mathematical model, the discharge voltage value of the (n+1)th pulse in the m-th pulse sequence is controlled to be equal to the discharge voltage value of the n-th pulse in the m-th pulse sequence plus the fourth voltage threshold.

Figure 2:
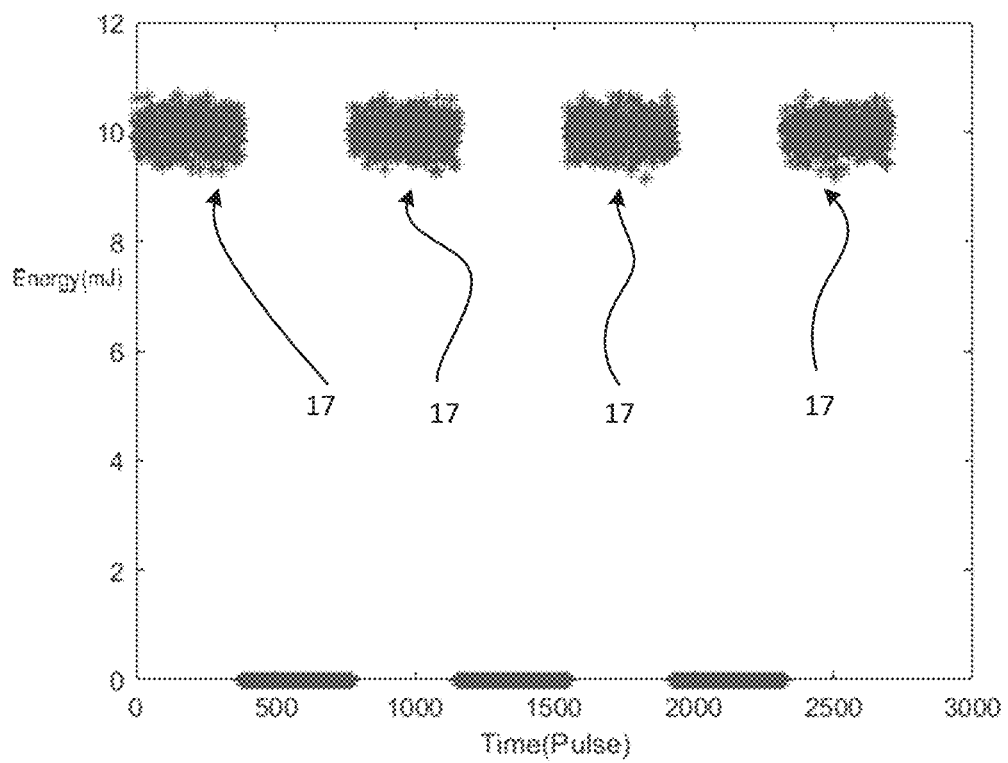
FIG. 2 is a schematic diagram illustrating the distribution of the emitted light energy distribution by using a control method according to an embodiment of the present disclosure.

In a specific embodiment according to the present disclosure, the light output frequency of the laser is 4 k Hz, each laser pulse sequence contains 375 pulses, and the preset energy value of the laser energy stability controller is 10 mJ. The energy distribution diagram obtained by the above-mentioned control method is illustrated in FIG. 2. Comparing FIG. 2 against FIG. 1, it can be seen that the energy overshoot in the original pulse sequence is well suppressed, and the energy value of each pulse in each pulse sequence 17 stays at about 10 mJ, and the relative standard deviation of the pulse energy is 1.6% by calculation. Thus, the energy stability is well controlled.

Therefore, this segmented feedback control method based on the position of the pulse in the pulse sequence that is provided by the present disclosure can effectively control the serious energy overshoot of the first few pulse of each pulse sequence, while stabilizing the energy of all pulses in a pulse sequence. Thus, the energy of all laser pulses emitted by the laser is stabilized at a certain level thus meeting the precision requirements of semiconductor lithography. This control method is simple and the control effect is significant.

Figure 3:
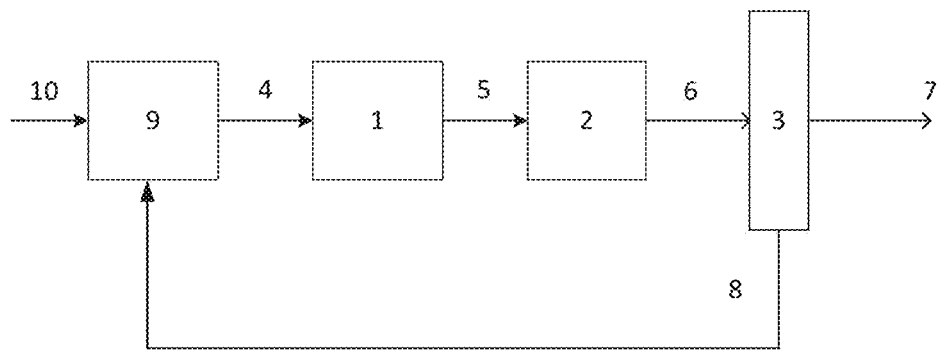
FIG. 3 is a block diagram of an excimer laser energy stability control system according to an embodiment of the present disclosure.
Figure 4:
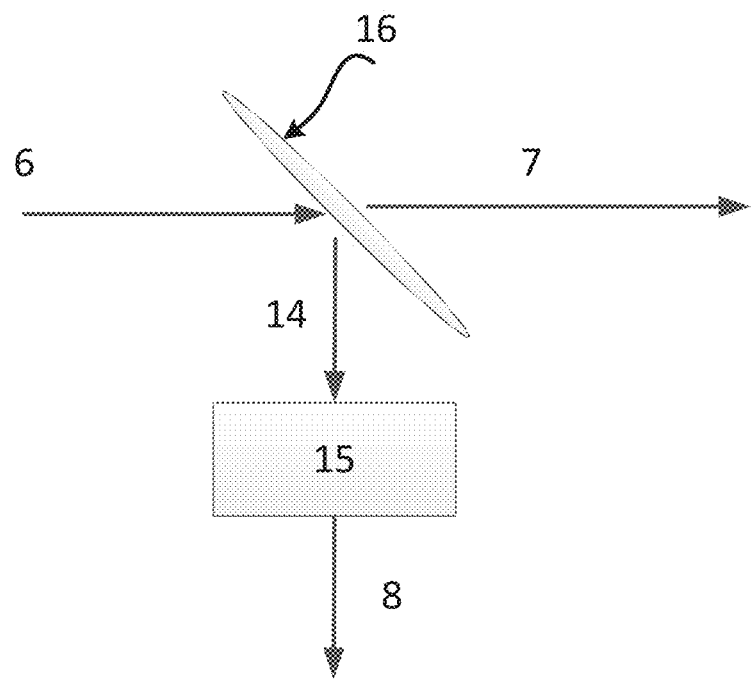
FIG. 4 is a schematic diagram illustrating a laser parameter measurement module according an embodiment of the present disclosure.

Another aspect of the present disclosure provides a control system based on the above control method. Now referring to the block diagram of the control system illustrated in FIG. 3. The control system includes a high-voltage discharge module 1, a laser cavity 2, a laser parameter measurement module 3, and an energy stabilization controller 9. The high voltage discharge module 1 may generate a pulse high voltage 5 according to the set discharge voltage value 4. The laser cavity 2 contains an operating gas, which when being shocked by the pulse high voltage 5 will trigger the laser cavity 2 to generate a laser pulse 6. The laser parameter measurement module 3 in this system serves the main function of detecting the energy of individual pulses of the laser thus providing a reference for the operation of the energy controller 9. Referring to FIG. 4 which illustrates a block diagram of the laser parameter measurement module 3 provided by an embodiment of the present disclosure. The laser parameter measurement module 3 includes a beam splitter 16 and an energy detector 15. After passing through the beam splitter 16, the laser pulse 6 is divided into a laser pulse 7 used for operation and a laser pulse 14 used for calculating the discharge voltage value of the next laser pulse 6. The laser pulse 14 irradiates on the energy detector 15 and is converted into an electric signal 8 to be sent to the energy stabilization controller 9. The energy stabilization controller 9 collects the energy value of the laser pulse 14 through the electric signal 8, and obtains the energy of the laser pulse 7 through proportional conversion, and then compares the energy value with the preset energy value 10, and estimate the discharge voltage value 4 of the next laser pulse 6 according to the control algorithm described above. Then the discharge voltage value 4 is transmitted to the high-voltage discharge module 1 to control the energy of the laser pulse 7 so that the energy value is consistent with the preset energy value 10 as much as possible. Therefore, the light output energy 7 of the laser is stabilized at the preset energy value 10, and the phenomenon of energy overshoot 13 of the laser in the Burst mode is eliminated.

According to some embodiments of the present disclosure, the ratio of the energy of the laser pulse 7 to the energy of the laser pulse 14 is (90~95)%:(10~5)%, and only the separating (10~5)% of the energy of the laser pulse 6 is able to satisfy the energy stability of the system.

The above-described control system provided by the present disclosure has a simple structure, and only a small amount of energy separated from the emitted laser pulse can stabilize the energy of the entire system.

Although the description of this disclosure refers to some exemplary illustrative embodiments, those having ordinary skill in the art will appreciate that the above illustrative embodiments are merely used to illustrate the present disclosure and rather than limit the scope of protection of the present disclosure. Any modification, equivalent replacement, improvement, etc. made within the spirit and principle scope of the disclosure shall be included in the scope of protection of the present disclosure.

What is claimed is:

1. A control method for stabilizing excimer laser pulse energy, wherein an excimer laser is used to emit a plurality of pulse sequences, where each pulse sequence contains a plurality of pulses, and an energy level of each pulse is controlled by limiting a corresponding discharge voltage value of the pulse, where the discharge voltage value is calculated by a proportional-integral (PI) control algorithm, the control method comprising:
   obtaining a measured energy value of an n-th pulse in an m-th pulse sequence;
   calculating a difference between the measured energy value and a preset energy value;
   when n is a positive integer less than z, estimating the discharge voltage value of an (n+1)th pulse in the m-th pulse sequence according to a first mathematical model, wherein the z is an integer that lies in the range of 10 to 100;
   when n is an integer greater than (z−1), estimating the discharge voltage value of the (n+1)th pulse in the m-th pulse sequence according to a second mathematical model; and
   generating the (n+1)th pulse in the m-th pulse sequence according to the discharge voltage value;
   where m is an integer greater than 1;
   wherein the first mathematical model is expressed in the following formula (1):

$$HV(m, n+1) = PK_{p1}\left(E_{error}(m-1, n+1) + \frac{PK_1}{PT_1}\sum_{i=1}^{m-1}E_{error}(i, n+1)\right) \quad (1)$$

where $E_{error}(m-1, n+1)$ represents the difference between the measured energy value and the preset energy value of the (n+1)th pulse in the (m−1)th pulse sequence, $\sum_{i=1}^{m-1}E_{error}(i, n+1)$ represents a sum of the difference between the measured energy value and the preset energy value of each (n+1)th pulse in the 1st~(m−1)th pulse sequences, $PK_{p1}$ is a proportional parameter of the PI control algorithm, $PK_1$ is an integral parameter of the PI control algorithm, and $PT_1$ is a control period parameter of the PI control algorithm;

wherein an incremental form of the first mathematical model is expressed in the following formula (2):

$$\Delta HV(m, n+1) = pK_{p1}(E_{error}[m-1, n+1] - E_{error}(m-2, n+1)) + PK_{p1}\frac{PK_1}{PT_1}E_{error}(m-1, n+1) \quad (2)$$

where $\Delta HV(m, n+1)$ represents an amount of change between the discharge voltage value of the (n+1)th pulse in the m-th pulse sequence and the (n+1)th pulse in the (m−1)th pulse sequence, $E_{error}(m-1, n+1)$ is the difference between the measured energy value and the preset energy value of the (n+1)th pulse in the (m−1)th pulse sequence, $E_{error}(m-2, n+1)$ is the difference between the measured energy value and the preset energy value of the (n+1)th pulse in the (m−2)th pulse sequence, $PK^{p1}$ is the proportional parameter of the PI control algorithm, $PK_1$ is the integral parameter of the PI control algorithm, and $PT_1$ is the control period parameter of the PI control algorithm;

wherein the discharge voltage value of the (n+1)th pulse in the m-th pulse sequence is expressed in the following formula (3):

$$HV(m,n+1) = HV(m-1,n+1) + \Delta HV(m,n+1) \quad (3)$$

where $HV(m-1, n+1)$ is the discharge voltage value of the (n+1)th pulse in the (m−1)th pulse sequence.

2. The control method of claim 1, wherein the second mathematical model is expressed in the following formula (4):

$$HV(m, n+1) = K_{p1}\left(E_{error}(m, n) + \frac{K_1}{T_1}\sum_{j=z+1}^{n}E_{error}(m, j)\right) \quad (4)$$

where $E_{error}(m, n)$ is the difference between the measured energy value and the preset energy value of the n-th pulse in the m-th pulse sequence, $\sum_{j=z+1}^{n}E_{error}(m, j)$ represents the sum of the difference between the measured energy value and the$^{preset}$ energy value of each of the (z+1)th~n-th pulses in the m-th pulse sequence, $K_{p1}$ is the proportional parameter of the PI control algorithm, $K_1$ is the integral parameter of the PI control algorithm, and $T_1$ is the control period parameter of the PI control algorithm.

3. The control method of claim 2, wherein an incremental form of the second mathematical model is expressed in the following formula (5):

$$\Delta HV(m, n+1) = K_{p1}(E_{error}(m, n) - E_{error}(m, n-1)) + K_{p1}\frac{K_1}{T_1}E_{error}(m, n) \quad (5)$$

where n is an integer greater than z, $\Delta HV(m, n+1)$ represents the amount of change between the discharge voltage value of the (n+1)th pulse in the m-th pulse sequence and the n-th pulse in the m-th pulse sequence, $E_{error}(m, n-1)$ is the difference between the measured energy value and the preset energy value of the (n−1)th pulse in the m-th pulse sequence, $E_{error}(m, n)$ is the difference between the measured energy value and the preset energy value of the n-th pulse in the m-th pulse sequence, $K_{p1}$ is the proportional parameter of the PI control algorithm, $K_1$ is the integral parameter of the PI control algorithm, and $T_1$ is the control period parameter of the PI control algorithm;

wherein the discharge voltage value of the (n+1)th pulse in the m-th pulse sequence is expressed in the following formula (6):

$$HV(m,n+1) = HV(m,n) + \Delta HV(m,n+1) \quad (6)$$

Where $HV(m, n)$ is the discharge voltage value of the n-th pulse in the m-th pulse sequence.

4. The control method of claim 1, wherein at least one selected from the group consisting of the following two operations is performed: the first being that when the calculated $HV(m, n+1)$ is greater than a first voltage threshold, the discharge voltage value of the (n+1)th pulse in the m-th pulse sequence is equal to the first voltage threshold; and the second being that when the calculated $HV(m, n+1)$ is less than a second voltage threshold, the discharge voltage value of the (n+1)th pulse in the m-th pulse sequence is equal to the second voltage threshold.

5. The control method of claim 2, wherein at least one selected from the group consisting of the following two operations is performed:
the first being that when the calculated $HV(m, n+1)$ is greater than a first voltage threshold, the discharge voltage value of the (n+1)th pulse in the m-th pulse sequence is equal to the first voltage threshold; and
the second being that when the calculated $HV(m, n+1)$ is less than a second voltage threshold, the discharge voltage value of the (n+1)th pulse in the m-th pulse sequence is equal to the second voltage threshold.

6. The control method of claim 3, wherein at least one selected from the group consisting of the following two operations is performed:
the first being that when the calculated $HV(m, n+1)$ is greater than a first voltage threshold, the discharge voltage value of the (n+1)th pulse in the m-th pulse sequence is equal to the first voltage threshold; and
the second being that when the calculated $HV(m, n+1)$ is less than a second voltage threshold, the discharge voltage value of the (n+1)th pulse in the m-th pulse sequence is equal to the second voltage threshold.

7. The control method of claim 1, wherein when the calculated $\Delta HV(m, n+1)$ is greater than a third voltage threshold, in the case of the first mathematical model, the discharge voltage value of the (n+1)th pulse in the m-th pulse sequence is equal to the discharge voltage value of the (n+1)th pulse in the (m−1)th pulse sequence plus the third voltage threshold; and in the case of the second mathematical model, the discharge voltage value of the (n+1)th pulse in the m-th pulse sequence is equal to the discharge voltage value of the n-th pulse in the m-th pulse sequence plus the third voltage threshold; and/or when the calculated ΔHV(m, n+1) is less than a fourth voltage threshold, in the case of the first mathematical model, the discharge voltage value of the (n+1)th pulse in the m-th pulse sequence is equal to the discharge voltage value of the (n+1)th pulse in the (m−1)th pulse sequence plus the fourth voltage threshold; and in the case of the second mathematical model, the discharge voltage value of the (n+1)th pulse in the m-th pulse sequence is equal to the discharge voltage value of the n-th pulse in the m-th pulse sequence plus the fourth voltage threshold.

8. The control method of claim 3, wherein when the calculated ΔHV(m, n+1) is greater than a third voltage threshold, in the case of the first mathematical model, the discharge voltage value of the (n+1)th pulse in the m-th pulse sequence is equal to the discharge voltage value of the (n+1)th pulse in the (m−1)th pulse sequence plus the third voltage threshold; and in the case of the second mathematical model, the discharge voltage value of the (n+1)th pulse in the m-th pulse sequence is equal to the discharge voltage value of the n-th pulse in the m-th pulse sequence plus the third voltage threshold; and/or when the calculated ΔHV(m, n+1) is less than a fourth voltage threshold, in the case of the first mathematical model, the discharge voltage value of the (n+1)th pulse in the m-th pulse sequence is equal to the discharge voltage value of the (n+1)th pulse in the (m−1)th pulse sequence plus the fourth voltage threshold; and in the case of the second mathematical model, the discharge voltage value of the (n+1)th pulse in the m-th pulse sequence is equal to the discharge voltage value of the n-th pulse in the m-th pulse sequence plus the fourth voltage threshold.

9. A control system for stabilizing excimer laser pulse energy, the control system comprising:
- a high-voltage discharge module, configured to generate a pulsed high voltage according to a set discharge voltage value;
- a laser cavity, containing an operating gas, which is operative to be shocked by the pulsed high voltage to generate a first laser pulse;
- a laser parameter measurement module, wherein the first laser pulse, after passing through the laser parameter measurement module, is divided into a second laser pulse for operation and a third laser pulse used to calculate the discharge voltage value of a next first laser pulse; and
- an energy stabilization controller, configured to obtain an energy value of the third laser pulse, calculate the discharge voltage value of the next first laser pulse according to the control method of claim 1, and transmit the discharge voltage value to the high-voltage discharge module.

10. The system of claim 9, wherein the laser parameter measurement module comprises a beam splitter and an energy detector, wherein the first laser pulse is divided into the second laser pulse for operation and the third laser pulse for calculating the discharge voltage value of the next first laser pulse after passing through the beam splitter, wherein the third laser pulse is converted into an electric signal after passing through the energy detector and sent to the energy stabilization controller; and wherein a ratio of an energy of the second laser pulse to an energy of the third laser pulse is (90~95) %:(10~5) %.

* * * * *